Patented Sept. 28, 1954

2,690,414

UNITED STATES PATENT OFFICE 2,690,414

REPOSITORY POLLEN EXTRACT COMPOSITIONS

Frank H. Buckwalter, De Witt, N. Y., assignor to Bristol Laboratories Inc., Syracuse, N. Y., a corporation of New York No Drawing. Application September 27, 1950, Serial No. 187,135

9 Claims. (Cl. 167—78)

This application is a continuation-in-part of my copending applications Serial Number 819, filed January 6, 1948, and Serial Number 19,497, filed April 7, 1948, and now abandoned.

The present application relates to repository or depot pollen extract compositions and more particularly to repository or depot compositions comprising a pollen extract dispersed in an injectable oil that has been gelled by the addition of a metal salt of a fatty acid.

A repository or depot composition, as referred to herein, is a composition containing a therapeutic substance which is normally capable of being parenterally injected, and which, upon injection, retards or prevents for long periods the rapid absorption of the therapeutic substance in the blood stream. It is essential that all of the repository composition itself subsequently be absorbed by the body. In the case of pollen extracts which are rapidly absorbed from aqueous solutions into the blood stream, it would be desirable to maintain a depot site from which the pollen extract may be slowly absorbed. This type of composition would cut down the incidence of toxic reactions from quickly absorbed doses of these biologicals and would eliminate the necessity for frequent injections.

The use of colloidal masses such as acacia, agar and gelatin to retard the absorption of drugs and biologically active materials has long been known. These, however, are not easily injectable and have not proved satisfactory for providing the required depot site.

The prolongation of therapeutic activity of drugs has also been attempted by use of various slowly absorbed vehicles, such as peanut oil, to which beeswax, globin and similar materials have been added. Such preparations possess certain disadvantages, however. In many cases, the drug is released much more rapidly than desired from a solution or suspension thereof in peanut oil. Peanut oil preparations containing globin are also unsatisfactory since these compositions fail to yield a satisfactory repository effect. In the case of preparations containing drugs suspended in peanut oil containing beeswax (4.8 percent or thereabout), the preparations are much more viscous than is desirable and the beeswax is an active sensitizer and may produce an allergic reaction upon injection into the body; there is also difficulty in eliminating the beeswax from the tissues after injection, although the absorption of the drug in the blood stream is retarded. Beeswax requires normally from 25 to 30 days for complete assimilation in the body. Sterile abscesses may frequently form when beeswax-containing preparations are used. Another preparation which has been proposed for the parenteral administration of drugs is a suspension of a drug in peanut oil containing pectin, but this has also failed to yield a satisfactory repository effect.

Heretofore aqueous emulsions which contain an oil such as the peanut oil and a drug, emulsification being effected and stabilized by use of a soap, have been disclosed as repository or depot preparations, but these cannot be used satisfactorily with water-soluble drugs. The drug dissolves in the water and is thus as rapidly absorbed as an aqueous solution thereof, while any portion of the drug which remains in the oil will not be held at the point of injection any longer than a similar preparation consisting merely of an oil solution or suspension of the drug.

I have discovered that the rate of absorption of pollen extracts can be greatly reduced and that their therapeutic effect can be maintained for long periods by parenteral injection of a composition comprising the pollen extracts suspended or dispersed in an injectable oil that has been gelled with a small proportion of an aluminum stearate or equivalent thereof. Such a composition is fluid and not unduly viscous and is readily injected through a hypodermic needle, even one of small size. I have also discovered that, whereas it has heretofore been considered necessary to use relatively large particles of the therapeutically active forms of these biologicals, small particles (50 microns or less) in the compositions of my invention provide better repository action than larger particles, although particles up to 150 microns in size give therapeutically satisfactory results.

The pollen extracts which, when incorporated into the gel as described herein, produce satisfactory repository compositions are the pollen extracts of the various grasses, such as Bermuda grass, bluegrass, brome grass, buffalo grass, Canada bluegrass, canary grass, corn, crab grass, goose grass, the mixed grasses, Johnson grass fescue, oats, orchard grass, quack grass (western wheat grass), redtop, rye, rye grass, sweet vernal grass, timothy, velvet grass, wheat yellow foxtail, etc., the pollen extracts of various trees and shrubs, such as alder, Arizona ash, ash, aspen, Austrian pine, beech, birch, black walnut, box elder, cottonwood, elm, English walnut, hazelnut, hickory, live oak, Lombardy poplar, maple, mountain cedar, oak (mixed), olive, pecan, privet, pussy willow, Scotch pine, shellbark hickory, sycamore, tree of heaven, etc. and the pollen extracts of the various weeds and cultivated herbs such as alfalfa, annual sage, annual saltbush, aster, biennial sage, burweed marsh elder, chrysanthemum, clematis, costal sagebrush, cocklebur, common plantain, corn, cosmos, dahlia, dandelion, English plantain, false ragweed, firebush (burning bush), grant ragweed, goldenglow, goldenrod, hemp, Indian hair tonic, lamb's quarters, lily, marigold, marsh elder, mugwort, ox-eye daisy, Palmer's amaranth, pasture sage, pigweed, poverty weed, prairie sage, quailbush, ragweed (mixed), red clover, red sorrel, rose, Russian thistle, sagebush, shadscale, short ragweed, slender false ragweed, Southern ragweed, spiny amaranth, sugar beet, sunflower, sweet clover, tall wormwood, western ragweed, western water hemp, white clover, yellow dock, etc. Also included in this invention are mixtures of the various pollens incorporated into the gel.

The repository compositions of my invention are dispersions that have the appearance of a solid viscous gel. When disturbed or shaken, however, the composition becomes much more fluid and runs as a liquid having a viscosity between 320 and 500 centipoises at a temperature of about 25° C. as determined by the Stormer viscosimeter. The composition may be referred to properly as a thixotropic gel suspension and it can readily be pulled up through a needle of a hypodermic syringe and discharged therefrom with even greater facility. Although more viscous and rigid gel compositions are contemplated in the broader aspects of my invention, which compositions may not be as readily drawn up in a hypodermic syringe, these compositions are nonetheless capable of use in "one-shot" syringe equipment in which the composition is dispersed in a compact syringe unit, since they possess even greater fluidity than comparable peanut oil-beeswax preparations and are much more readily ejected from syringes under moderate pressure.

The repository pollen extract compositions of my invention may be obtained in the form of thixotropic gels which, after shaking or stirring flow as liquids but set again, on standing, to gels. The compositions are substantially anhydrous. On adding small amounts of water to the compositions, the gel thickens and loses some of its thixotropic properties; further amounts of water produce a separation of the composition into an aqueous phase and a viscous oily or waxy solid. Accordingly, it is advisable in using the compositions to keep them dry and to avoid adding water to them or bringing them into contact with water, as in water-washed but undried syringes, although substantial proportions of water are normally necessary to affect the composition greatly and render it unusable or difficult to dispense.

The gel or vehicle portion of the repository composition of my invention is produced from peanut oil or an ester of a fatty acid having 12 or more carbon atoms in the molecule. Ethyl oleate is eminently suitable, as are esters of alcohols such as methyl, ethyl, propyl, butyl, glycol and glycerol with long-chain saturated and unsaturated monocarboxylic acids having from 12 to 22 carbon atoms, inclusive. Esters of hydroxy-substituted acids of this group, for example, castor oil, are less suitable than the simple unsubstituted acids. The preferred esters are the fatty oils which are readily saponifiable and which are non-drying; such preferred oils are peanut, sesame, soy bean, cottonseed, and corn. Other saponifiable esters, not included in this group which are also suitable are isoamyl salicylate, dibutyl sebacate and ethyl-$\alpha$-phenylbutyrate. The preferred esters are normally liquid, hence beeswax, which is predominantly myricyl palmitate (myricin), the palmitic acid myricyl alcohol ($C_{30}H_{61}OH$), is not a suitable ester. The esters specified herein include the normal dodecanoic (lauric), tridecanoic, tetradecanoic (myristic), pentadecanoic, hexadecanoic (palmitic), heptadecanoic (margaric), octadecanoic (stearic), nonadecanoic, eicosanoic (arachidic), heneicosanoic, and docosanoic (behenic) acids as well as their branched-chain isomers and corresponding unsaturated acids, including palmitoleic, oleic, ricinoleic, petroselinic, vaccenic, linoleic, linolenic, eleostearic, licanic, parinaric, gadoleic, arachidonic, cetoleic and erucic acids. Mixtures of esters, such as occur in natural oils and fats, are included within the scope of this invention.

Peanut oil or other suitable ester, as referred to herein, is transformed to a gel before incorporating the pollen extracts. This gelling is effected by treatment of the oil with a small proportion of a salt or soap of aluminum and a fatty acid, for example, an aluminum stearate. Commercial grades of aluminum stearate are suitable and their designations as aluminum monostearate, aluminum distearate and aluminum tristearate, relate more particularly to their content of aluminum rather than to their actual compositions. All three of the purest aluminum stearates referred to are soaps and are generally noncrystalline and probably have similar or identical components which conform to the general theoretical formula—

$$Al(OH)_n(C_{17}H_{35}COO)_{3-n}$$

For the purpose of my invention I have found that the products designated as aluminum monostearate and aluminum distearate are very similar in properties and are preferable to aluminum tristearate, although the tristearate is usable for the purposes of my invention. The preparations of these aluminum soaps of fatty acids has heretofore been described and they are well-known articles of commerce.

The germanium or zirconium salts of fatty acids may be used in place of the aluminum salts for gelling the esters; however, the corresponding calcium, barium, magnesium, zinc, strontium, sodium and potassium salts or soaps do not produce gels which possess the desired repository effects.

The preferred salts for the gelling of the ester are aluminum salts of fatty acids and I prefer to use aluminum salts of the same or similar fatty acids as those of the ester. Thus, in gelling the glycerol ester of lauric acid, I prefer to use aluminum laurate instead of aluminum stearate, although satisfactory compositions are produced where aluminum stearate is used for gelling peanut oil. It is not necessary that the acid of the aluminum salt have more than 12 carbon atoms, since there may be an acid interchange with the oil and the result will not be substantially different from that obtained by the use of the specified salts.

The function of the various components of my repository composition are not understood clearly and the theory of repository action is complicated further by the fact that so many varied and unrelated substances have exhibited some degree of repository action. From the very nature and behavior of my compositions in comparison with compositions made from peanut oil and beeswax, I believe different actions to be involved in the respective cases. The appearance and characteristics of a composition outside the body reveal with respect to its action or the transformations it undergoes after injection into the body. Nonetheless, for lack of better knowledge, I believe the unique properties of the compositions of my invention to be attributable to the gel character of the vehicle. The gel may have a latticework structure in which the metal soap molecules are at various corners of cubes or other patterns formed by the ester or oil molecules and this latticework structure controls the release of pollen extracts from the gel. It is for this reason that I prefer to use as gelling agents a metal salt of the same or a similar fatty acid as that of the oil or ester. Aluminum 2-ethyl-hexoate, for example, is a good gelling agent for ethyl-alpha-phenylbutyrate and I have prepared satisfactory compositions from such gels in accordance with my invention.

The amount of aluminum or other gelling agent which is used should be approximately within the range of 1 to 10% and preferably within the range of 1 to 4% of the oil or ester. These percentages, as well as all other percentages with reference to this particular phase of my invention, represent parts by weight of the gelling agent to parts by volume of the oil or ester; the abbreviations "% (w./v.)" or "percent (w./v.)" are used. A gel formed by gelling peanut oil with 2% (w./v.) of aluminum stearate is the preferred material for the composition of this invention. It is desirable to use as little of the metal salt or soap as possible since such materials may slow down the subsequent absorption of the composition in the body after all the therapeutic agent has been absorbed.

To gel the oil or ester, the oil is heated with the gelling agent, preferably with stirring, to a suitable temperature, which may vary somewhat with different esters and proportions of materials but which will generally be below 150° C. Peanut oil can be readily gelled by heating it with 2% (w./v.) of aluminum monostearate to approximately 118 to 135 degrees centigrade, at which point the suspension or dispersion becomes clear. To prevent fusion or agglomeration of the aluminum stearate particles, the aluminum stearate is added below approximately 80 degrees centigrade and preferably at the start at room temperature. The entire batch is kept well-stirred during the heating, which may be at the rate of approximately 2 to 3 degrees per minute. There is little danger in overheating, provided decomposition of the oil is not engendered; the characteristics of the gel are not substantially affected by heating for longer periods or to higher temperatures. Other methods are not as easily performed and controlled as this simple heating step.

After the ester has been gelled, it is cooled, and the pollen extract is added thereto in powdered form and incorporated by stirring.

The following example will serve to further illustrate my invention without limiting it thereto.

Example

To 100 cc. of peanut oil was added 2% (w./v.) of powdered commercial aluminum monostearate and the mixture agitated for 15 minutes with the temperature less than 100° F. The mixture was then agitated and heated until the temperature was 135° C. The heating was conducted at the rate of 2 to 3 degrees centigrade per minute. The mixture cleared and the gel formed at about 118–120° C. when the temperature reached 135° C., heating was discontinued and the mixture agitated until the temperature reached 120° C. At this point, agitation was stopped and the gel allowed to cool to room temperature.

To the above gel were added 3 grams of dried ragweed extract. (Previously lyophilized using sterile technique.) The mixture was agitated, milled for 5 minutes in an Eppenbach colloid mill set at #10 setting and remixed for 15 minutes at room temperature with a laboratory agitator.

It is understood that variations in the concentration of the pollen extracts can be made and are within the scope of this invention and that many other variations can be made in accordance with the principles disclosed without departing from the scope of this invention, which is limited solely by the appended claims.

I claim:

1. A substantially anhydrous injectable therapeutic preparation comprising a pollen extract dispersed in a vehicle comprising an injectable oil having dispersed therein a quantity of a fatty acid salt of a metal selected from the group consisting of aluminum, zirconium and germanium sufficient to maintain prolonged therapeutic effect of said extract upon injection of said preparation compared with the therapeutic effect obtained upon injection of a similar preparation containing no fatty acid salt of said metal, said fatty acid being selected from a group consisting of long chain saturated and unsaturated monocarboxylic acids having from 12 to 22 carbon atoms, inclusive.

2. A substantially anhydrous injectable therapeutic preparation comprising a pollen extract dispersed in a vehicle comprising an injectable oil having dispersed therein a quantity of an aluminum salt of a fatty acid selected from a group consisting of long chain saturated and unsaturated monocarboxylic acids having from 12 to 22 carbon atoms, inclusive, in the molecule, sufficient to maintain prolonged therapeutic effect of said extract upon injection of said preparation compared with the therapeutic effect obtained upon injection of a similar preparation containing no aluminum salt of a fatty acid.

3. A substantially anhydrous therapeutic preparation comprising a pollen extract dispersed in a vehicle comprising an injectable oil having dispersed therein a quantity of an aluminum stearate sufficient to maintain prolonged therapeutic effect of said extract upon injection of said preparation compared with the therapeutic effect obtained upon injection of a similar preparation containing no stearate.

4. A substantially anhydrous therapeutic preparation as set forth in claim 3 characterized in that said injectable oil is a non-drying saponifiable oil which is normally liquid and the quantity of an aluminum stearate dispersed in said injectable oil is within the range of from approximately 0.1 to approximately 10% based upon parts by weight of said stearate to parts by volume of said oil.

5. A substantially anhydrous therapeutic preparation as set forth in claim 3 characterized in that said injectable oil is a non-drying saponifiable oil which is normally liquid and the quantity of an aluminum stearate dispersed in said injectable oil is within the range of from 1 to 4% based upon parts by weight of said stearate to parts by volume of said oil.

6. A substantially anhydrous therapeutic preparation comprising a pollen extract dispersed in a vehicle comprising peanut oil having dispersed therein 4% of aluminum monostearate based upon parts by weight of said stearate to parts by volume of said oil, said aluminum monostearate being effective to maintain prolonged therapeutic effect of said extract upon injection of said preparation compared with the therapeutic effect obtained upon injection of a similar preparation containing no monostearate.

7. A substantially anhydrous therapeutic preparation comprising a pollen extract dispersed in a vehicle comprising peanut oil having dispersed therein 2% of aluminum monostearate based upon parts by weight of said stearate to parts by volume of said oil, said aluminum monostearate being effective to maintain prolonged therapeutic effect of said extract upon injection of said preparation compared with the therapeutic effect obtained upon injection of a similar preparation containing no monostearate.

8. A substantially anhydrous injectable therapeutic preparation comprising a pollen extract dispersed in a vehicle comprising an injectable oil having dispersed therein a quantity of an aluminum stearate sufficient to maintain prolonged therapeutic effect of said extract upon injection of said preparation compared with the therapeutic effect obtained upon injection of a similar preparation containing no stearate.

9. A substantially anhydrous therapeutic preparation comprising rag-weed pollen extract dispersed in a vehicle comprising peanut oil having dispersed therein 2% of aluminum monostearate based upon parts by weight of said stearate to parts by volume of said oil, said aluminum monostearate being effective to maintain prolonged therapeutic effect of said extract upon injection of said preparation compared with the therapeutic effect obtained upon injection of a similar preparation containing no monostearate.

References Cited in the file of this patent

UNITED STATES PATENTS

| Number | Name | Date |
| --- | --- | --- |
| 2,327,564 | Scherer | Aug. 24, 1943 |
| 2,507,193 | Buckwalter | May 9, 1950 |

OTHER REFERENCES

Fischer, "Unguentum Alumnii Stearatis," Ohio State Med., Jour., Aug. 1942, page 756.

Lazarowitz, "Effective Treatments of Extremely Sensitive Hay Fever Patients by the Chilling Method," Jour. of Allergy, Mar. 1947, pages 104–108.